Patented Oct. 31, 1922.

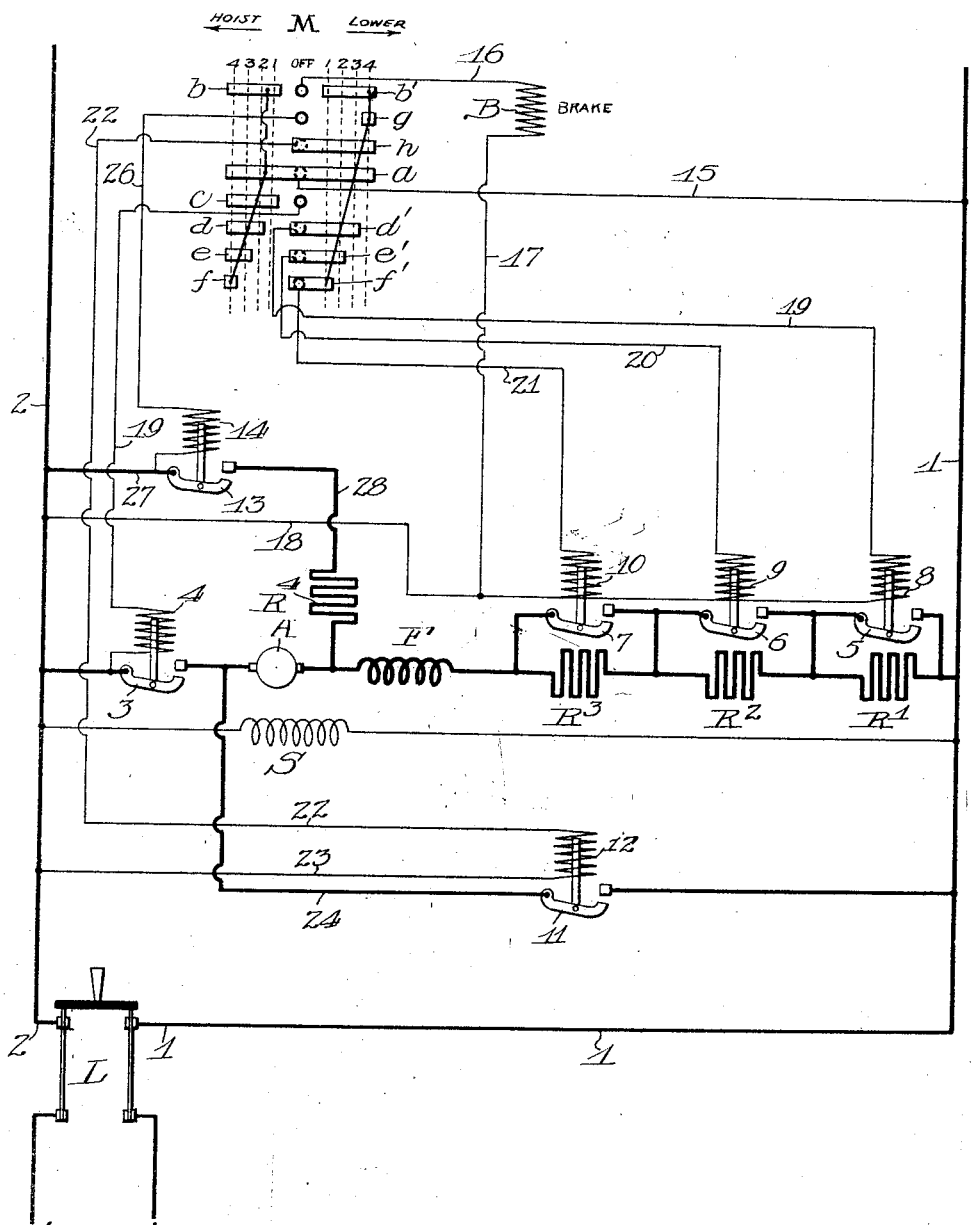

1,434,055

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR-CONTROL SYSTEM.

Application filed September 14, 1908. Serial No. 452,884.

*To all whom it may concern:*

Be it known that I, CLARK T. HENDERSON, a citizen of the United States, residing at Milwaukee, in the county of Milwaukee and State of Wisconsin, have invented new and useful Improvements in Motor-Control Systems, of which the following is a full, clear, concise, and exact description, reference being had to the accompanying drawing, forming a part of this specification.

This invention relates to a motor control system.

Among the objects of the invention is to provide a motor control system having a controller in which a maximum number of control positions is secured with a minimum number of switches.

Other objects and advantages will hereinafter appear.

The invention as applied to a compound motor, is illustrated in the accompanying drawing.

For the sake of clearness, the several appliances employed in the motor control system have been illustrated in elementary forms, and various auxiliary parts that in practice may be associated therewith have been discarded.

The compound motor is provided with an armature A, a series field F and a shunt-field S. Of course, the motor may be of any suitable type. The current for operating the motor is supplied from conductors 1 and 2 which are connected respectively to the positive and negative supply lines. One terminal of the motor may be connected to the positive supply line through the resistances $R^1$, $R^2$ and $R^3$. Between the other side of the motor and the negative supply main is arranged a switch 3, which is actuated by a solenoid 4. Switches 5, 6 and 7, which are actuated by solenoids 8, 9 and 10, are connected with the resistances and when said switches are closed said resistances are short-circuited.

When the switch 3 is closed, the motor is connected between the supply lines. If the switches 5, 6 and 7 be open, the resistances $R^1$, $R^2$ and $R^3$ will be in series with the armature. Of course, the resistances may be connected in circuit in any suitable way to perform the desired function. These resistances may be short-circuited by closure of the switches 5, 6 and 7, as will be hereinafter explained.

For the purpose of establishing a dynamic braking circuit around the motor, a switch 11 actuated by a solenoid 12 is provided.

In order that the motor may be run in a reverse direction, a switch 13 operated by a solenoid 14 is provided. This switch serves to connect a point between the armature and series field to the negative line through an auxiliary resistance $R^4$.

The operation of the various switches is directed by means of a master controller M. It will be assumed that the master controller is of the drum type and that its handle may be turned to either the right or the left from the "off" position. In the drawing there is shown a simple development of the master controller which will be readily understood by those skilled in the art. The controller drum is provided with a segment $a$ on which bears a finger connected to the positive line. On the left-hand side of the drum are arranged segments $b$, $c$, $d$, $e$ and $f$ and on the right-hand side. segments $b'$, $g$, $h$, $d'$, $e'$ and $f'$. Suitable contact fingers are arranged to engage the segments and pass over them as the drum is turned. These fingers are represented in the drawing by circles arranged in a vertical line down the center of the development. From these fingers, connectons extend to various parts of the controller. When the handle is in the "off" position, the segments $h$, $a$, $d'$, $e'$ and $f'$ are engaged by their respective fingers.

As previously stated, the controller handle may be turned either to the left or to the right. Connections are provided whereby the motor will be run in the forward direction if the handle be turned in one of these directions and will be reversed if the handle be turned in the other direction. In either direction there are four different positions to which the drum may be turned, and these positions are indicated by dotted lines upon the development.

In describing the operation of the controller, it will be assumed that it is used to control a motor which is employed to operate a hoisting and lowering mechanism. The brake of this mechanism may be released by means of a solenoid B in any suitable manner known in the art.

If it be desired to hoist the load, the motor is run in a forward direction. Accordingly, the controller handle is turned to bring the left-hand segments into engagement with the contact fingers. When the drum reaches the first position, the segments $b$ and $c$ will be engaged by their respective fingers. Accordingly the brake solenoid will release the brake and the switch 3 will be closed. As previously stated, the finger bearing on the segment $a$ is connected to the positive line. Hence current flows from the positive line through conductor 1, conductor 15 to the segment $a$ and thence to the other segments through suitable connections. The circuit of the brake solenoid B extends from the segment $b$, through conductor 16, brake solenoid B, conductor 17 and conductor 18 to the negative line. The circuit of the solenoid 4 extends from the segment $c$ through conductor 19, solenoid 4 to the negative line.

The motor will now run in the forward direction and hoist the load. The motor current flows from the positive line through conductor 1, resistances $R^1$, $R^2$, and $R^3$, series field F, armature A, switch 3 and conductor 2 to the negative line. The shunt-field S is connected directly across the conductors 1 and 2 and thus energized, save when the line switch L is open.

As the drum passes through the second, third and fourth positions, the segments $d$, $e$ and $f$ are engaged successively by their respective fingers which are connected respectively to the solenoids 8, 9 and 10. Hence, switches 5, 6 and 7 will be closed successively, thereby short-circuiting resistances $R^1$, $R^2$ and $R^3$. Inasmuch as these switches are thus closed one after the other, the resistance is removed from the motor circuit gradually as the speed of the motor builds up. The drum may be placed in any one of these positions to include more or less resistance in the motor circuit for the purpose of giving the motor different speeds. One terminal of each of the solenoids 8, 9 and 10 is connected to the conductor 18. The other terminals of said solenoids are connected to the fingers of segments $d$, $e$ and $f$, respectively, by means of conductors 19, 20 and 21. The circuits of these solenoids extend from the drum through conductors 19, 20 and 21 and solenoids 8, 9 and 10 in parallel and thence through conductor 18 to the negative line.

While the drum is in the "off" position, the solenoids 8, 9 and 10, are all energized as segments $d'$, $e'$ and $f'$ are engaged by their respective fingers. Hence switches 5, 6 and 7 are closed and the resistances $R^1$, $R^2$ and $R^3$ are thus short-circuted. The switch 11 is also closed as its solenoid 12 is connected in circuit by means of the segment $h$ which is engaged by its respective contact finger. The circuit of solenoid 12 can be traced from the segment $h$, through conductor 22, solenoid 12 and conductor 23 to the negative line. So it will be seen that when the master controller is in the "off" position, the resistances $R^1$, $R^2$ and $R^3$ are all short-circuited and the armature A and series field F are connected in a closed circuit by means of switch 11. This circuit forms a dynamic braking circuit and can be traced from one side of the armature, through conductor 24, switch 11, conductor 25, conductor 1, switches 5, 6 and 7, and series field F to the other side of the armature.

If it is desired to lower the load, the master controller is moved to bring the right-hand segments into engagement with their contact fingers. In the first position, the segment $b'$ will engage its respective finger and close the circuit through the brake solenoid. The circuit of the brake solenoid can be traced from the segment $b'$ through the same path as was previously described. The resistances are now short-circuited and the armature A, series field F and resistances $R^1$, $R^2$ and $R^3$ are connected in a closed circuit by means of the switch 11. This closed circuit forms a dynamic braking circuit. If the load be heavy, it will descend of its own weight, thereby driving the motor armature. In consequence, the motor armature will develop a braking current which will flow through the braking circuit and cause the motor to retard the descent of the load. Under certain conditions of operation, the braking action will be so great that the load will descend very slowly. If the load is not heavy, it is quite probable that it will be unable to overcome the inertia and friction of the mechanism, and hence it will not start to descend of its own weight. In such a case it is necessary to reverse the motor by current taken form the line. To do this, the controller is moved to the fourth position on the right. As it passes the first, second and third positions, the segments $f'$, $e'$ and $d'$ disengage their respective fingers; and hence switches 7, 6 and 5 are opened, thereby inserting resistances $R^1$, $R^2$ and $R^3$ in the braking circuit. When the controller reaches the fourth position, switch 13 is closed, the circuit of its solenoid being closed by segment $g$ engaging its respective finger. The circuit of this solenoid may be traced from segment $g$, through conductor 26, solenoid 14 and conductor 27 to the negative line. Switch 13 then establishes a circuit which leads from the positive line, through conductor 1 and then divides. One division of the circuit extends through conductor 25, switch 11, conductor 24 and armature A and the other through resistances $R^1$, $R^2$ and $R^3$ and series field F. The divisions of the circuit then reunite at a point between armature A and series field F and from there the circuit extends through auxilary resistance R⁴, conductor 28, switch 13, conductor 27 and conductor 2 to the negative line. The auxiliary resistance R⁴ protects the motor armature from an excessive current. It is usually only necessary to leave the controller in the fourth position but an instant, as it is merely necessary to give the load a start and then it will descend of its own weight. The master controller is then moved back through the third, second and first positions. By moving it in this manner, the resistances R¹, R² and R³ are short-circuited successively, thereby increasing the dynamic braking action of the motor, as the less the resistance the lower the speed at which the armature will rotate under a given load. When the load approaches the position where it is stopped, the master controller may be moved to the "off" position, thereby causing the full dynamic braking action of the motor and applying the mechanical brake.

By connecting the motor to one side of the line, at a point intermediate of the armature A and the series field F, the armature A and the series field F being connected in parallel to the other side of the line, I am enabled to reverse the motor and keep the series field in circuit without the necessity of providing any additional switches for the purpose of reversing the connections of the series field. The shunt-field S is connected directly across the line, and hence its polarity is constant. The series field F is so connected in circuit that the current always flows through it in the same direction, irrespective of the connections that are established by the several switches. When either the switch 3 or 13 is closed, current flows through the series from right to left and when these switches are open and switch 11 is closed the braking current always flows through it in the same direction. Hence, its polarity is always the same. The flow of current is merely reversed in the armature circuit. When switch 3 is closed, the armature current flows from right to left. When switches 13 and 11 are closed, the armature current flows from left to right and when simply switch 11 is closed, the braking current flows from right to left. The auxiliary resistance R⁴ protects the armature against an excessive current when switch 13 is closed to reverse the motor.

The number of switches that are required in the controller to run the motor in either the forward or reverse direction and to cause the motor to act as a dynamic brake and to enable the series field to be arranged in the braking circuit, is less than has been required in other structures. To obtain all these results, at least one or more switches have been required in addition to those which are employed in the controller herein described.

The invention set forth herein is, of course, susceptible of other embodiments and adaptations.

The invention claimed is:—

1. A motor control system comprising a motor having a series field, a switch for connecting one terminal of the armature to the source of electrical energy, another switch for connecting the other terminal of the armature to the source of electrical energy at a point between the armature and the series field, and a third switch for connecting a dynamic braking circuit across the motor armature whereby said series field is connected in said braking circuit.

2. A motor control system comprising a motor having a series field, a switch for connecting one terminal of the motor armature to the source of electrical energy, another switch for connecting a point between said armature and said series field to said source of electrical energy through a resistance, and a third switch for connecting a dynamic braking circuit across the motor armature in a manner to include the series field in said braking circuit.

3. In a motor control system, a motor having a series field, a resistance arranged to be connected in circuit with the armature and series field of said motor, an electromagnetically operated switch for connecting one terminal of the motor armature to one side of the source of electrical energy, and two other electromagnetically operated switches, one to connect a point between said armature and said series field to one side of the source of electrical energy and the other to close a dynamic braking circuit including said armature, said series field and said resistance.

4. In a motor control system, a motor having a series field, a resistance arranged to be connected in circuit with the armature and series field of said motor, an electromagnetically operated switch for connecting one terminal of the motor armature to one side of the source of electrical energy, and two other electromagnetically operated switches, one to connect a point between said armature and said series field to one side of the source of electrical energy and the other to close a dynamic braking circuit including said armature, said series field and said resistance, and a master controller for directing the operation of said switches.

5. In a motor control system, a motor having a series field, a resistance adapted to be connected in circuit in series with the motor armature and the series field, electromagnetically operated switch for controlling said resistance, a switch for connecting one terminal of the motor armature to one side of the source of electrical energy, another electromagnetically operated switch for connecting a point between the motor armature and the series field to one side of the source of electrical energy through a resistance, and a third electromagnetically operated switch for connecting a dynamic braking circuit to include the armature, the series field and the first mentioned resistance.

6. In a motor control system, a motor having a series field, a resistance adapted to be connected in circuit in series with the motor armature and the series field, electromagnetically operated switch for controlling said resistance, a switch for connecting one terminal of the motor armature to one side of the source of electrical energy, another electromagnetically operated switch for connecting a point between the motor armature and the series field to one side of the source of electrical energy through a resistance, and a third electromagnetically operated switch for connecting a dynamic braking circuit to include the armature, the series field and the first mentioned resistance, and a master controller for directing the operation of said switches.

In witness whereof, I have hereunto subscribed my name in the presence of two witnesses.

CLARK T. HENDERSON.

Witnesses:
S. W. FitzGerald,
R. S. Ulrick.